US012674765B2

(12) United States Patent
Fulford et al.

(10) Patent No.: US 12,674,765 B2
(45) Date of Patent: Jul. 7, 2026

(54) REFLECTING NON-PLANAR SURFACES INTEGRATED WITH LASER SCAN FOR POSEIDON TOOL INTEGRATION

(71) Applicant: Tokyo Electron Limited, Tokyo (JP)

(72) Inventors: H. Jim Fulford, Marianna, FL (US);
Daniel Fulford, Albany, NY (US);
Mark I. Gardner, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 104 days.

(21) Appl. No.: 18/613,406

(22) Filed: Mar. 22, 2024

(65) Prior Publication Data

US 2025/0297969 A1 Sep. 25, 2025

(51) Int. Cl.
G01N 21/95 (2006.01)
G01N 21/88 (2006.01)

(52) U.S. Cl.
CPC ..... G01N 21/9503 (2013.01); G01N 21/8806 (2013.01); G01N 2201/0636 (2013.01)

(58) Field of Classification Search
CPC ........... G01N 21/9503; G01N 21/8806; G01N 2201/0636
See application file for complete search history.

(56) References Cited

U.S. PATENT DOCUMENTS

| | | | | | |
|---|---|---|---|---|---|
| 6,545,279 | B1 * | 4/2003 | Yoshida | ................ | H10P 74/238 |
| | | | | | 250/341.4 |
| 2004/0012775 | A1 * | 1/2004 | Kinney | .............. | G01N 21/9501 |
| | | | | | 356/237.2 |

| | | | | | |
|---|---|---|---|---|---|
| 2004/0207836 | A1 * | 10/2004 | Chhibber | ........... | G01N 21/8806 |
| | | | | | 356/237.4 |
| 2008/0239301 | A1 * | 10/2008 | Yokota | ............... | G01N 21/9503 |
| | | | | | 356/237.2 |
| 2009/0201495 | A1 * | 8/2009 | Hiramoto | ........... | G01N 21/9503 |
| | | | | | 356/243.4 |
| 2011/0199480 | A1 * | 8/2011 | Lev | .................... | G01N 21/9503 |
| | | | | | 348/126 |
| 2016/0097726 | A1 * | 4/2016 | Ahn | ........................ | G01N 21/95 |
| | | | | | 356/237.1 |
| 2017/0243738 | A1 * | 8/2017 | Noda | .................. | H01L 21/0274 |
| 2020/0083081 | A1 * | 3/2020 | Kusakawa | ........ | H01L 21/67132 |
| 2021/0082729 | A1 * | 3/2021 | Hansen | .................. | H10P 72/53 |

(Continued)

FOREIGN PATENT DOCUMENTS

WO WO-2010015694 A1 * 2/2010 ......... G01N 21/9503

*Primary Examiner* — Michael P LaPage
(74) *Attorney, Agent, or Firm* — Oblon, McClelland, Maier & Neustadt, L.L.P.

(57) ABSTRACT

Aspects of the present disclosure provide an apparatus. For example, the apparatus can include a wafer holder for holding a wafer, a light reflection device located beside a wafer edge and having a light reflection surface tilted with respect to a wafer surface, and a coherent light source for generating incident light to perform a scan on the wafer surface and the light reflection surface, which can reflect the incident light to generate reflection light, which can be detected by a light detector. The coherent light source, the light reflection device and the light detector can be arranged such that the incident light passes by the wafer edge and the reflection light generated by the light reflection surface is detected by the light detector or the reflection light generated by the light reflection surface passes by the wafer edge and is detected by the light detector.

20 Claims, 11 Drawing Sheets

(56) References Cited

U.S. PATENT DOCUMENTS

| 2022/0293448 | A1* | 9/2022 | Chen ..................... G06T 7/0004 |
| 2023/0314343 | A1* | 10/2023 | Hishitani .......... H01L 21/67253 |
| | | | 356/237.1 |
| 2024/0355083 | A1* | 10/2024 | Drillman ............ G01N 21/9503 |

* cited by examiner

300

G

321

324

384

331

191

190

G

332

333

G

322

323

G

REFLECTING NON-PLANAR SURFACES INTEGRATED WITH LASER SCAN FOR POSEIDON TOOL INTEGRATION

FIELD OF THE INVENTION

The present disclosure relates to wafer edge detection, and, more particularly, to reflecting non-planar surfaces integrated with laser scan for Poseidon tool integration.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Manufacturers of semiconductors have made significant improvements in quality, speed and performance of end products and manufacturing processes. The edge of a semiconductor wafer can be a leading indicator of process statuses, and, by monitoring the edge of the semiconductor wafer for changes in appearance, tighter process control can be implemented.

SUMMARY

Aspects of the present disclosure provide an apparatus that includes non-planar reflection surfaces integrated with coherent light scan for Poseidon Tool Integration according to some embodiments of the present disclosure. For example, the apparatus can include a wafer holder configured to hold a wafer thereon, and a first light reflection device located beside an edge of the wafer held on the wafer holder. The first light reflection device can have a first light reflection surface tilted with respect to a wafer surface of the wafer. The apparatus can also include a coherent light source configured to generate incident light to perform a scan on the wafer surface of the wafer and the first light reflection surface of the first light reflection device. The wafer surface of the wafer and the first light reflection surface of the first light reflection device can reflect the incident light to generate reflection light. The apparatus can also include a light detector configured to detect the reflection light. The coherent light source, the first light reflection device and the light detector can be arranged such that the incident light generated by the coherent light source passes by the edge of the wafer and the reflection light generated by the first light reflection surface of the first light reflection device is detected by the light detector or the reflection light generated by the first light reflection surface of the first light reflection device passes by the edge of the wafer and is detected by the light detector. For example, the scan can be a raster scan. As another example, the scan can be a sinusoidal scan. In an embodiment, the light detector can be located over a center of the wafer. In another embodiment, the light detector can be located over a non-center of the wafer. For example, the light detector can be located over the edge of the wafer.

In an embodiment, the wafer holder and the first light reflection device can be configured to rotate with respect to each other. For example, the wafer holder can be configured to rotate with respect to the first light reflection device. As another example, the first light reflection device can be configured to rotate with respect to the wafer holder, and an angle at which the first light reflection surface of the first light reflection device is tilted with respect to the wafer can be adjusted in accordance with a relative position of the rotating first light reflection device with respect to the coherent light source. In some embodiments, the coherent light source can be configured to generate the incident light to perform the scan on the wafer surface of the wafer and the first light reflection surface of the first light reflection device in a direction pointing along a radius of the wafer from a center of the wafer.

In an embodiment, the apparatus can also include a second light reflection device located beside the edge of the wafer, the second light reflection device can have a second light reflection surface tilted with respect to the wafer surface of the wafer, the coherent light source can be further configured to generate the incident light to perform the scan on the second light reflection surface of the second light reflection device, the second light reflection surface of the second light reflection device can reflect the incident light to generate reflection light, and the coherent light source, the first light reflection device and the light detector can be arranged such that the incident light generated by the coherent light source passes by the edge of the wafer and the reflection light generated by the second light reflection surface of the second light reflection device is detected by the light detector or the reflection light generated by the second light reflection surface of the second light reflection device passes by the edge of the wafer and is detected by the light detector. For example, the first light reflection device and the second light reflection device can be separated from each other by a gap.

In an embodiment, the wafer holder can be stationary with respect to the first light reflection device, the coherent light source can be stationary with respect to the light detector, and the first light reflection device and the coherent light source can move with respect to each other along a direction parallel to the first light reflection surface of the first light reflection device.

In an embodiment, the wafer can have a vertical projection within the first light reflection device, and the first light reflection surface is around a circumference of the wafer. In another embodiment, the wafer holder can be stationary with respect to the first light reflection device.

In an embodiment, the wafer can have a wafer notch formed at the edge. In another embodiment, the wafer can have a wafer flatness formed at the edge. In some embodiments, the coherent light source can be a laser source. In various embodiments, the wafer holder can be a wafer chuck. For example, the wafer chuck can be a vacuum spin chuck.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
FIG. 1 is a schematic diagram of a first exemplary apparatus that includes non-planar reflection surfaces integrated with coherent light scan for Poseidon Tool Integration according to some embodiments of the present disclosure.
Figure 1:
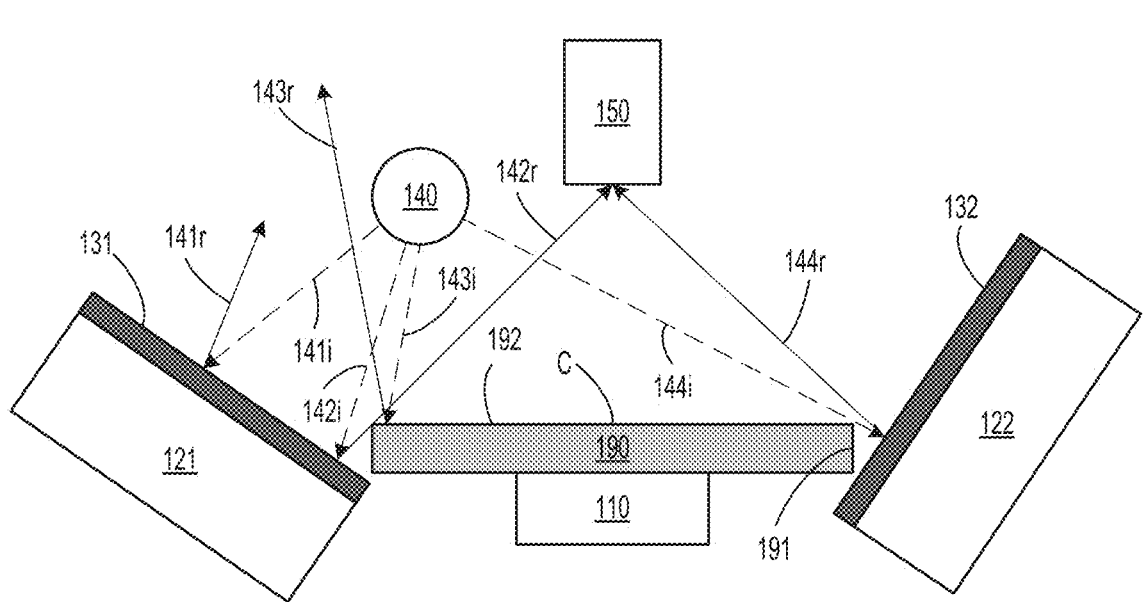

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

A wafer surface of a wafer (e.g., a silicon (Si) wafer), which can be held by a wafer holder (e.g., a wafer chuck), will provide a coherent reflection when coherent light (e.g., laser) is shined upon it (i.e., the angle of incidence of the laser shined on the wafer surface is equal to the angle of reflection). Thus, if a region of the wafer holder adjacent to the wafer surface (e.g., a region beside the edge of the wafer surface) is in the same plane as the wafer surface, a light detector (e.g., a laser detector) cannot readily identify the edge (or circumference) of the wafer (or differentiate the edge of the wafer relative to the adjacent region of the wafer holder).

Aspects of the present disclosure provide a non-planar tool chuck design that may be rotated such that reflected (x, y, z) light (e.g., laser) may be reflected to a light detector (e.g., a laser detector). FIG. 1 is a schematic diagram of an exemplary apparatus 100 that includes non-planar reflection surfaces integrated with coherent light scan (e.g., laser scan) for Poseidon Tool Integration according to some embodiments of the present disclosure.

The apparatus 100 can include a wafer holder 110 that is configured to hold a wafer 190 thereon. For example, the wafer holder 110 can be a wafer chuck (such as a vacuum chuck, e.g., a vacuum spin chuck).

The apparatus 100 can also include a first light reflection device 121 that is located beside an edge 191 of the wafer 190 which is held on the wafer holder 110. In an embodiment, the first light reflection device 121 can have a first light reflection surface 131 that is tilted (i.e., non-coplanar) with respect to a wafer surface 192 of the wafer 190. As shown in FIG. 1, the apparatus 100 can also include a second light reflection device 122 that is located beside the edge 191 of the wafer 190. In an embodiment, the second light reflection device 122 can have a second light reflection surface 132 that is also tilted (i.e., non-coplanar) with respect to the wafer surface 192 of the wafer 190.

The apparatus 100 can also include a coherent light source 140 (e.g., a laser source) that is configured to generate (coherent) incident light (e.g., first to fourth incident light 141*i*-144*i*) to perform a scan on the first light reflection surface 131 of the first light reflection device 121, the wafer surface 192 of the wafer 190 and the second light reflection surface 132 of the second light reflection device 122. In an embodiment, the first light reflection surface 131 of the first light reflection device 121, the wafer surface 192 of the wafer 190 and the second light reflection surface 132 of the second light reflection device 122 can be configured to reflect the incident light (i.e., the first to fourth incident light 141*i*-144*i*) and generate reflection light (e.g., first to fourth reflection light 141*r*-144*r*), respectively.

The apparatus 100 can also include a light detector 150 (e.g., a laser detector) that is configured to detect the reflection light (i.e., the second and fourth reflection light 142*r* and 144*r*) reflected from the first light reflection surface 131 of the first light reflection device 121 and and the second light reflection surface 132 of the second light reflection device 122.

In an embodiment, the coherent light source 140, the first light reflection device 121, the second light reflection device 122 and the light detector 150 can be arranged such that the incident light generated by the coherent light source 140 passes by the edge 191 of the wafer 190 and the corresponding reflection light generated by the first light reflection surface 131 of the first light reflection device 121 and the second light reflection surface 132 of the second light reflection device 122 is detected by the light detector 150 and/or the reflection light generated by the first light reflection surface 131 of the first light reflection device 121 and the second light reflection surface 132 of the second light reflection device 122 passes by the edge 191 of the wafer 190 and is detected by the light detector 150. Therefore, the edge 191 of the wafer 190 can be determined at moments from the light detector 150 detecting no reflection light to the light detector 150 detecting the reflection light and from the light detector 150 detecting the reflection light to the light detector 150 detecting no reflection light.

For example, when the scan is performed the fourth incident light **144*i* generated by the coherent light source 140 passes by the edge 191 of the wafer 190 and the corresponding fourth reflection light 144*r* generated by the second light reflection surface 132 of the second light reflection device 122 is detected by the light detector 150, thus detecting the edge 191 of the wafer 190 where the second light reflection device 122 is located. As another example, when the scan is performed the second reflection light 142*r* generated by the first light reflection surface 131 of the first light reflection device 121 passes by the edge 191 of the wafer 190 and is detected by the light detector 150, thus detecting the edge 191 of the wafer 190 where the first light reflection device 121 is located. By contrast, the first and third incident light 141*i* and 143*i* generated by the coherent light source 140 do not pass by the edge 191 of the wafer 190 and the corresponding first and third reflection light 141*r* and 143*r* generated by the first light reflection surface 131 of the first light reflection device 121 and the wafer surface 192 of the wafer 190, respectively, neither pass by the edge 191 of the wafer 190 nor are detected by the light detector 150. It is thus determined that the edge 191 of the wafer 190** is not detected.

In an embodiment, the wafer 190 can have a wafer notch or a wafer flatness formed at the edge 191, that can be used to locate the wafer 190. Therefore, the apparatus 100 can be utilized for alignment of the wafer notch or wafer flatness.

Figure 2:
FIG. 2 is a schematic diagram of a second exemplary apparatus that includes non-planar reflection surfaces integrated with coherent light scan for Poseidon Tool Integration according to some embodiments of the present disclosure.
Figure 2:
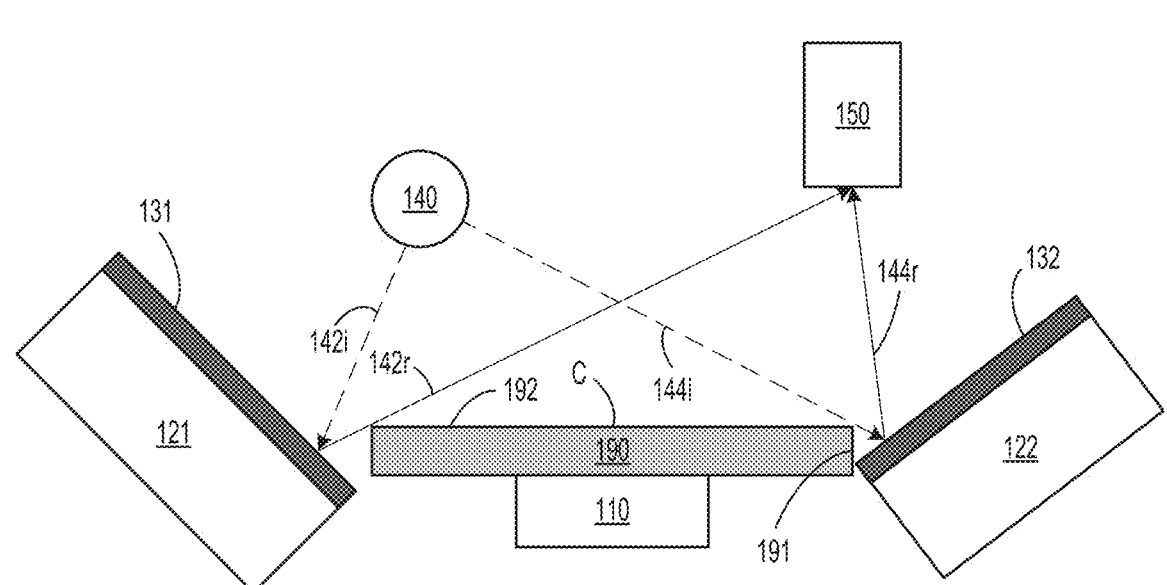

In an embodiment, the light detector 150 can be located over a center C of the wafer 190, as shown in FIG. 1. In another embodiment, the light detector 150 can be located over a non-center of the wafer 190. For example, the light detector 150 can be located over the edge 191 of the wafer 190, as shown in FIG. 2, which is a schematic diagram of an apparatus 200 that includes non-planar reflection surfaces integrated with coherent light scan (e.g., laser scan) for Poseidon Tool Integration according to some embodiments of the present disclosure.

Figure 3:
FIG. 3 is a top view of a third exemplary apparatus that includes non-planar reflection surfaces integrated with coherent light scan for Poseidon Tool Integration according to some embodiments of the present disclosure.

In the example embodiment shown in FIG. 1, the apparatus 100 includes two light reflection devices, i.e., the first and second light reflection devices 121 and 122. In some embodiments, the apparatus 100 may include one, three or more light reflection devices. FIG. 3 is a top view of an exemplary apparatus 300 that includes non-planar reflection surfaces integrated with coherent light scan (e.g., laser scan) for Poseidon Tool Integration according to some embodiments of the present disclosure. As shown in FIG. 3, the apparatus 300 can include four light reflection devices 321-324, neighboring two of which are separated from each other by a gap G. In an embodiment, each of the four reflection devices 321-323 has a light reflection surface, e.g., light reflection surfaces 331-334. The apparatus 300 can also include a wafer holder (e.g., the wafer holder 110) (not shown), a coherent light source (e.g., the coherent light source 140) (not shown) and a light detector (e.g., the light detector 150) (not shown) such that incident light generated by the coherent light source passes by the edge of an wafer (e.g., the wafer 190) held on the wafer holder and corresponding reflection light generated by the light reflection surface of each of the light reflection devices is detected by the light detector and/or the reflection light generated by the light reflection surface of each of the light reflection devices passes by the edge of the wafer and is detected by the light detector.

In various embodiments, the apparatus 100 may include only one light reflection device (e.g., the second light reflection device 122), and the wafer holder 110 and the second light reflection device 122 can be configured to rotate with respect to each other. For example, the wafer holder 110 can be configured to rotate with respect to the second light reflection device 122. As another example, the second light reflection device 122 can be configured to rotate with respect to the wafer holder 110, and an angle at which the second light reflection surface 132 of the second light reflection device 122 is tilted with respect to the wafer 190 is adjusted in accordance with a relative position of the rotating second light reflection device 122 with respect to the coherent light source 140.

FIGS. 4A-4F are schematic diagrams of an exemplary apparatus 400 that includes non-planar reflection surfaces integrated with coherent light scan (e.g., laser scan) for Poseidon Tool Integration according to some embodiments of the present disclosure. The apparatus 400 can include a wafer holder 410 (e.g., the wafer holder 110) that is configured to hold a wafer 490 (e.g., the wafer 190) thereon that has a wafer surface 492 (e.g., the wafer surface 192), and a light reflection device 420 (e.g., the first and second light reflection devices 121 and 122) that is located beside an edge 491 of the wafer 490 (e.g., the edge 191 of the wafer 190) which is held on the wafer holder 410. In an embodiment, the light reflection device 420 can have a light reflection surface 430 that is tilted (i.e., non-coplanar) with respect to the wafer surface 492 of the wafer 490.

The apparatus 400 can also include a coherent light source 440 (e.g., the coherent light source 140) that is configured to generate (coherent) incident light (e.g., incident light **441*i*) to perform a scan on the light reflection surface 430 of the light reflection device 420 and the wafer surface 492 of the wafer 490. In an embodiment, the light reflection surface 430 of the light reflection device 420 and the wafer surface 492 of the wafer 490 can be configured to reflect the incident light (i.e., the incident light 441*i*) and generate reflection light 441*r*-446*r***, respectively.

The apparatus 400 can also include a light detector 450 (e.g., the light detector 150) that is configured to detect the reflection light (i.e., the reflection light **441*r*-443*r* and 446*r*) reflected from the light reflection surface 430 of the light reflection device 420**.

In an embodiment, the coherent light source 440, the light reflection device 420 and the light detector 450 can be arranged such that the incident light generated by the coherent light source 440 passes by the edge 491 of the wafer 490 and the corresponding reflection light generated by the light reflection surface 430 of the light reflection device 420 is detected by the light detector 450 and/or the reflection light generated by the light reflection surface 430 of the light reflection device 420 passes by the edge 491 of the wafer 490 and is detected by the light detector 450. In another embodiment, the wafer holder 410 can be stationary with respect to the light reflection device 420, the coherent light source 440 can be stationary with respect to the light detector 450, and the light reflection device 420 and the coherent light source 440 can move with respect to each other along a direction (indicated by a double arrow dotted line) parallel to the light reflection surface 430 of the light reflection device 420.

Figure 4A:
FIGS. 4A-4F are schematic diagrams of a fourth exemplary apparatus that includes non-planar reflection surfaces integrated with coherent light scan for Poseidon Tool Integration according to some embodiments of the present disclosure.
Figure 4A:
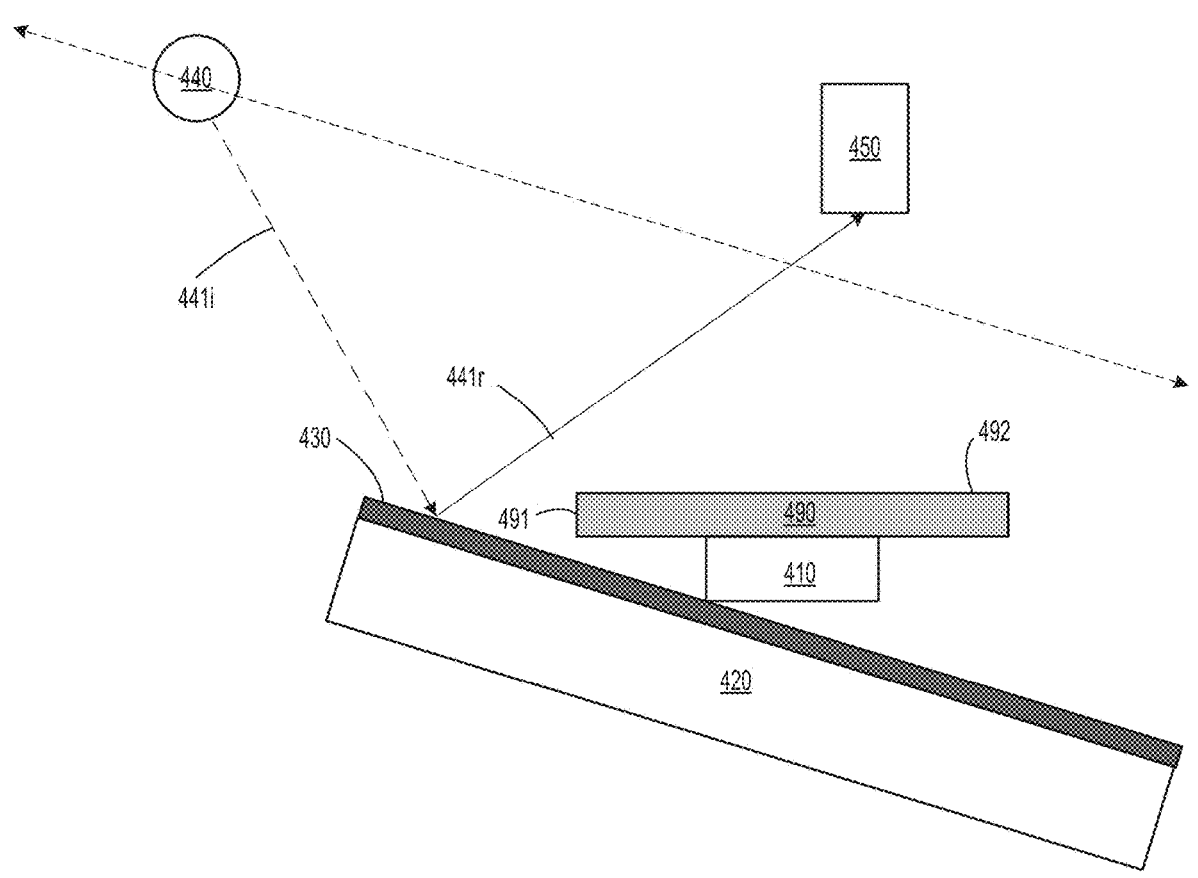
Figure 4B:
Figure 4B:
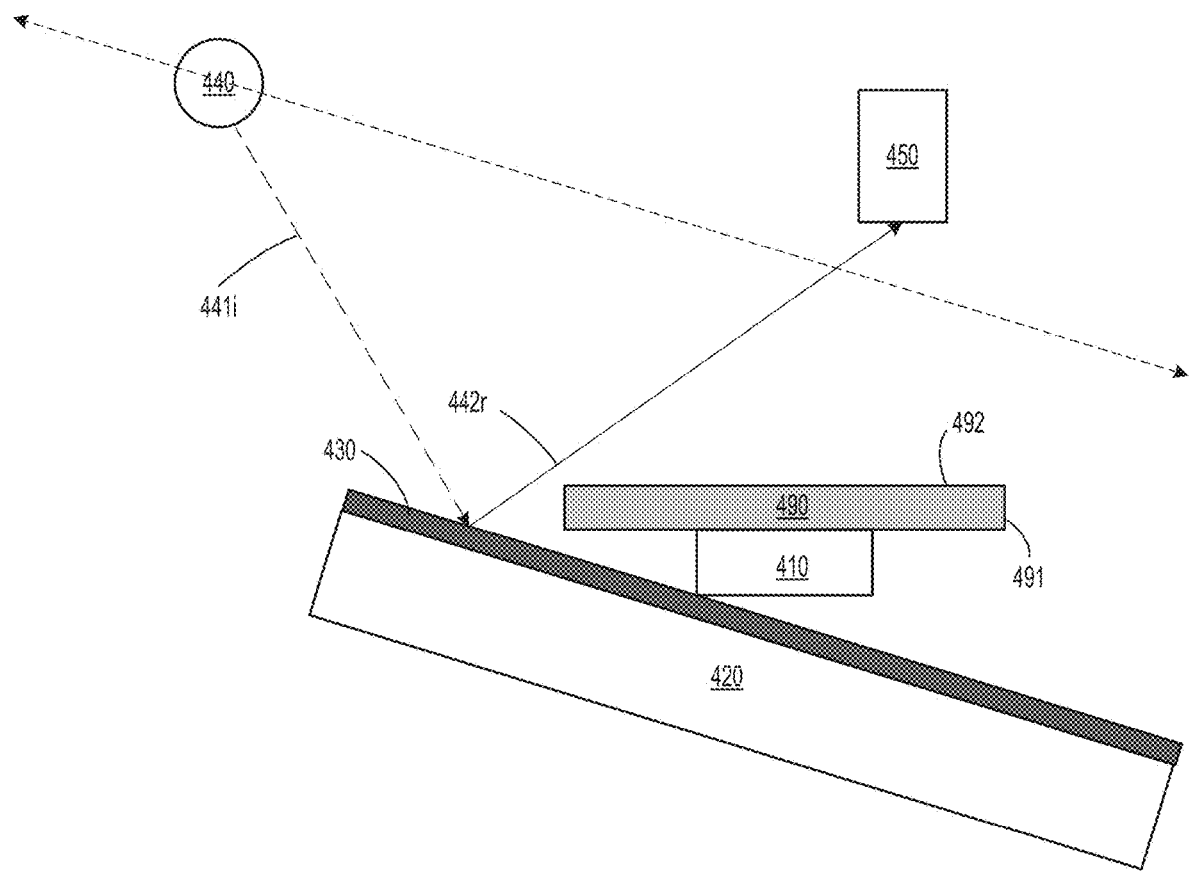
Figure 4C:
Figure 4C:
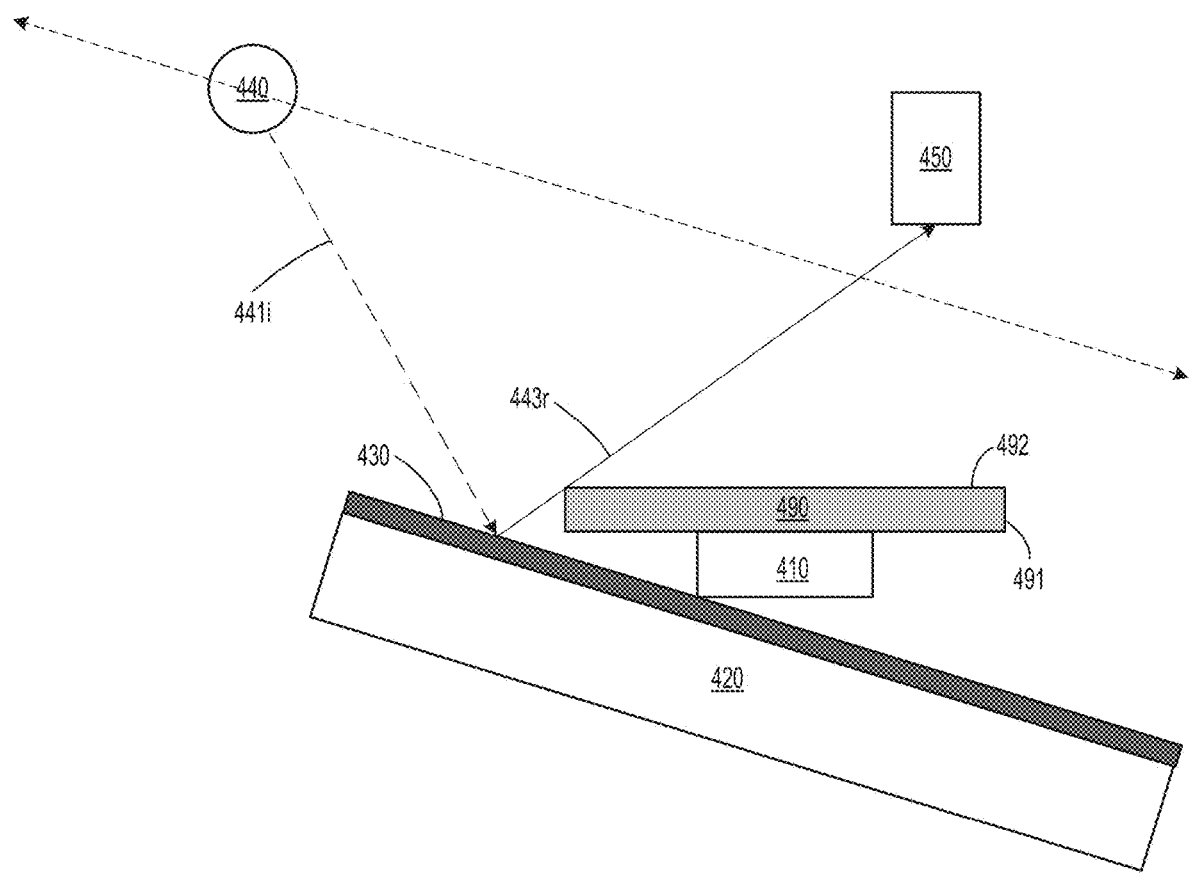
Figure 4D:
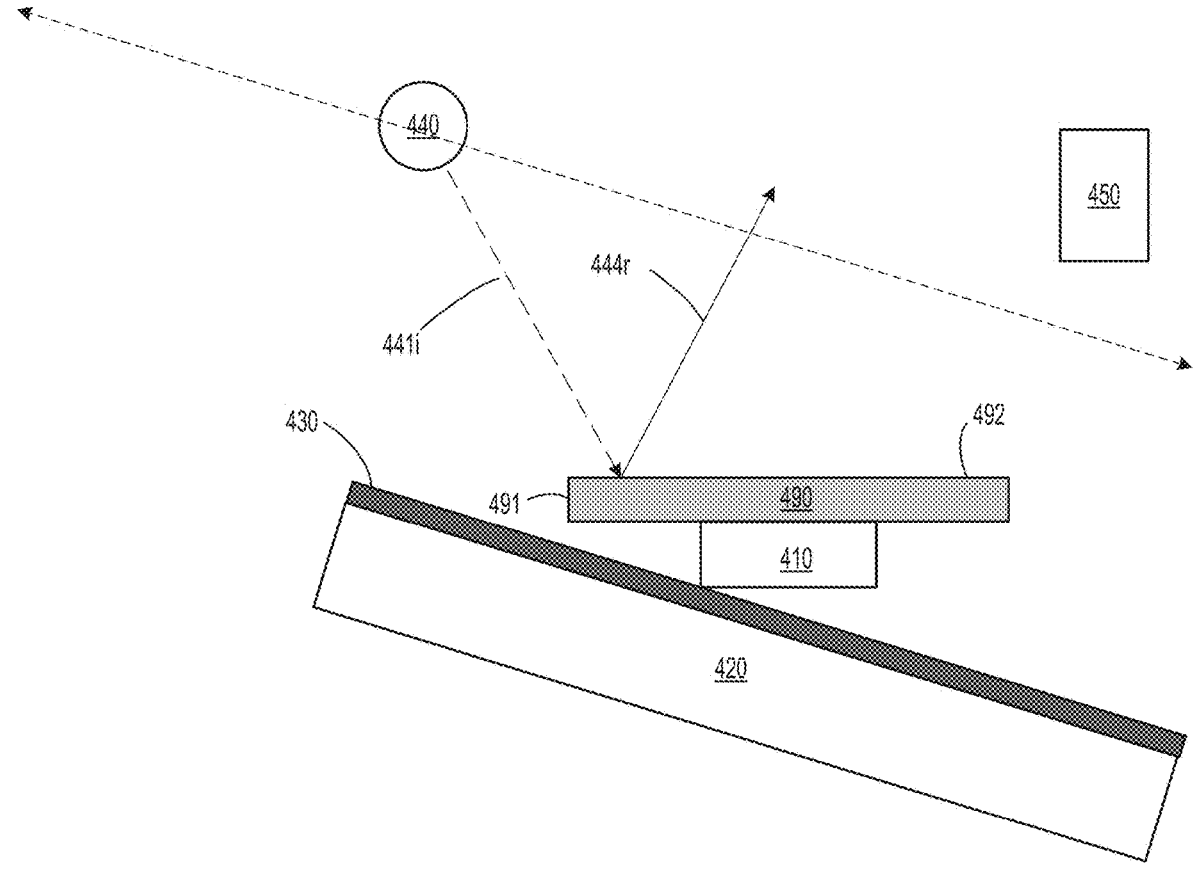
Figure 4E:
Figure 4E:
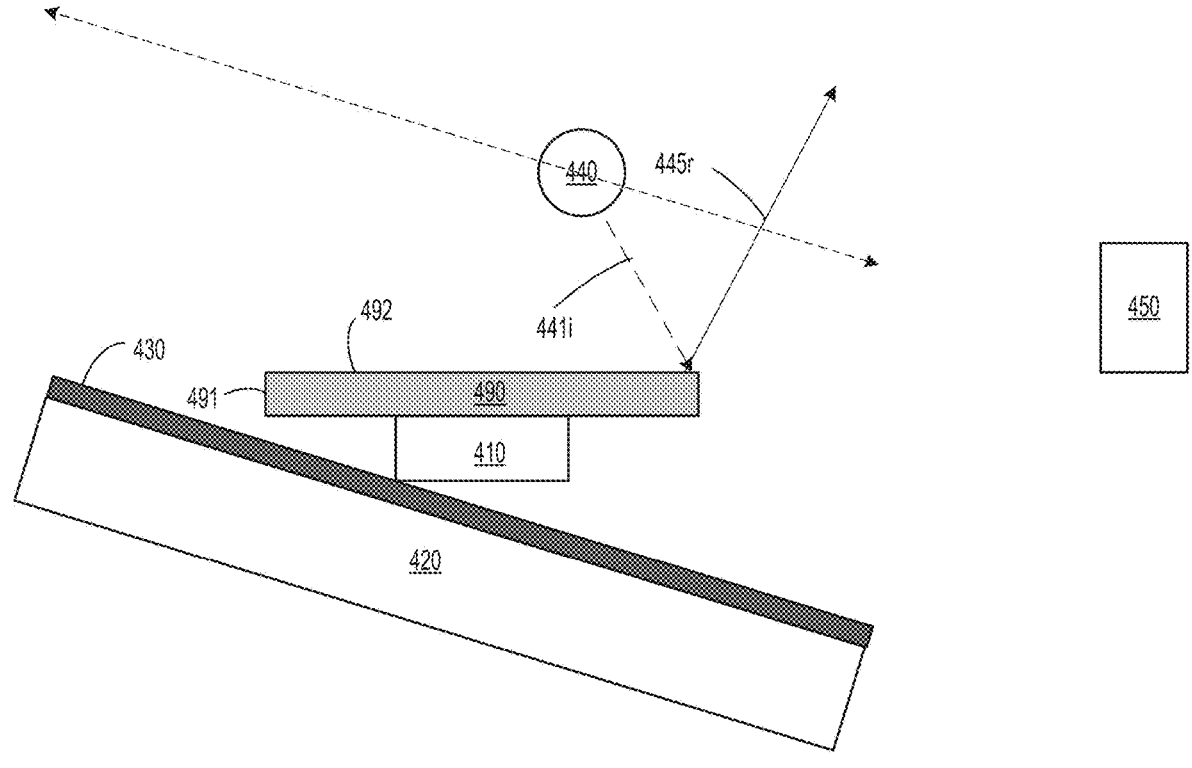
Figure 4F:
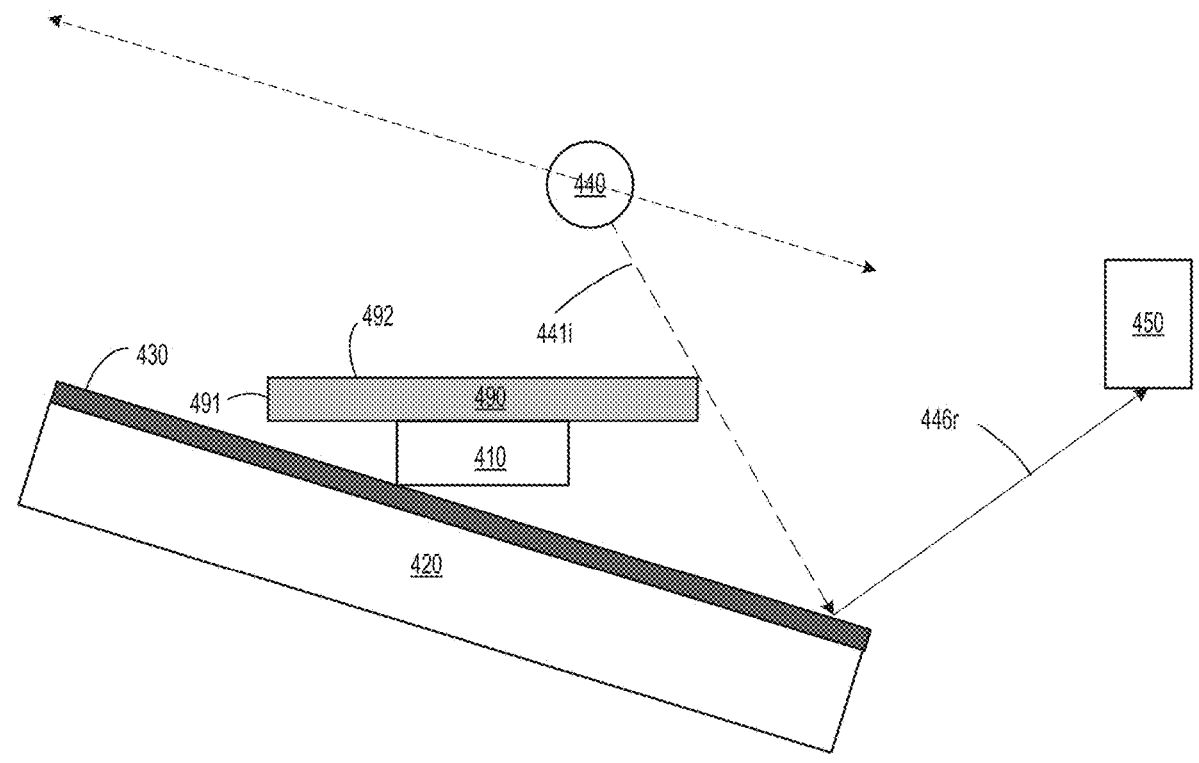
Figure 4F:
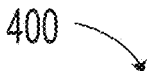

For example, the incident light **441*i* generated by the coherent light source 440 passes by the edge 491 of the wafer 490 and the corresponding reflection light 446r generated by the light reflection surface 430 of the light reflection device 420 is detected by the light detector 450, thus detecting the edge 491 of the wafer 490, as shown in FIG. 4F. As another example, the reflection light 4463 generated by the light reflection surface 430 of the light reflection device 420 passes by the edge 491 of the wafer 490 and is detected by the light detector 450, thus detecting the edge 491 of the wafer 490, as shown in FIG. 4C. By contrast, as shown in FIGS. 4D and 4E, the incident light 441i generated by the coherent light source 440 does not pass by the edge 491 of the wafer 490 and the corresponding reflection light 444r and 445r generated by the wafer surface 492 of the wafer 490 neither pass by the wafer surface 492 of the wafer 490 nor are not detected by the light detector 450. It is thus determined that the edge 491 of the wafer 490** is not detected.

Figure 5:
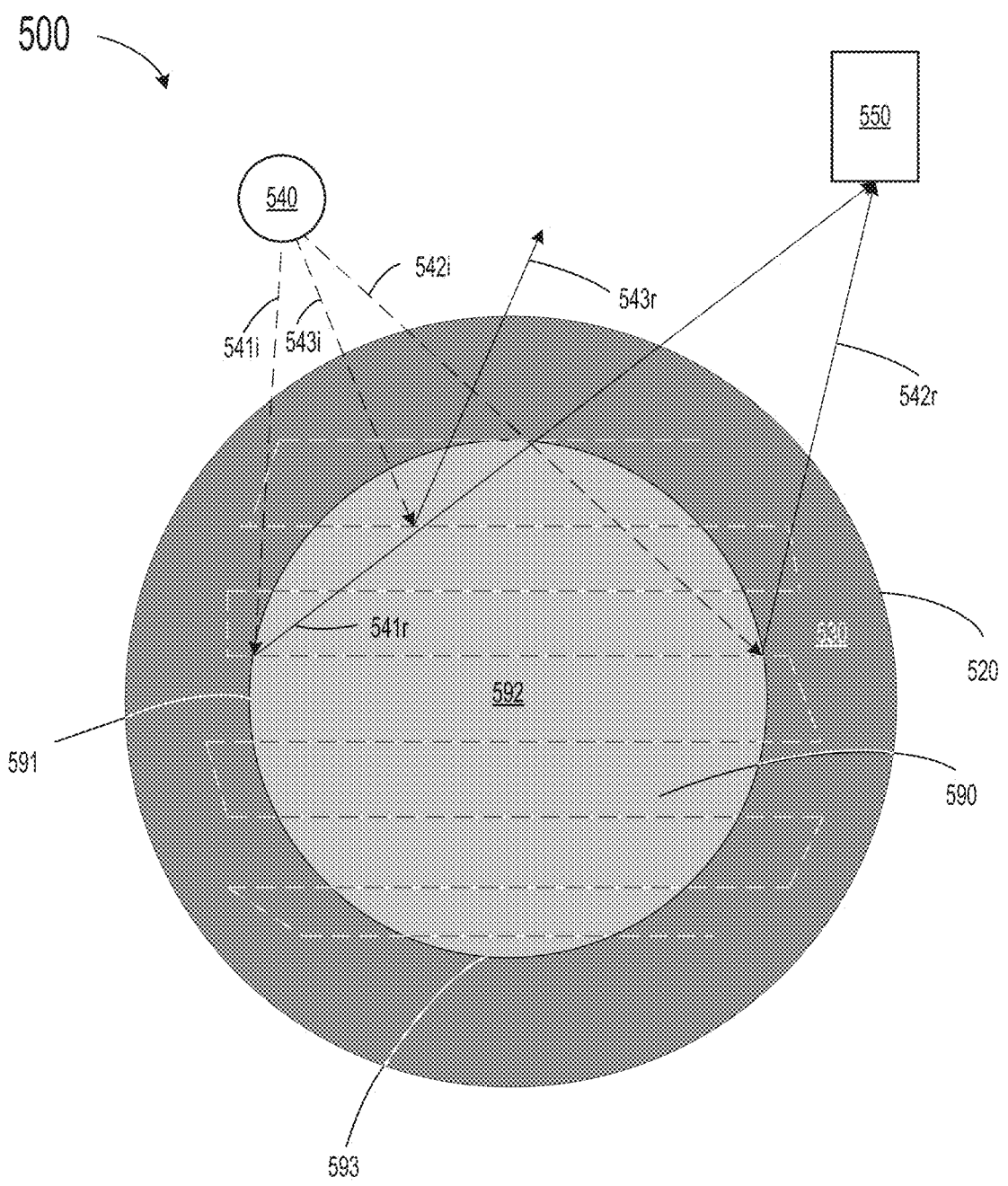
FIG. 5 is a top view of a fifth exemplary apparatus that includes non-planar reflection surfaces integrated with coherent light scan for Poseidon Tool Integration according to some embodiments of the present disclosure.

FIG. 5 is a top view of an exemplary apparatus 500 that includes non-planar reflection surfaces integrated with coherent light scan (e.g., laser scan) for Poseidon Tool Integration according to some embodiments of the present disclosure. As shown in FIG. 5, the apparatus 500 can include a wafer holder (e.g., the wafer holder 110) (not shown) that is configured to hold a wafer 590 (e.g., the wafer 190) thereon that has a wafer surface 592 (e.g., the wafer surface 192), and a light reflection device 520 (e.g., the first and second light reflection devices 121 and 122) that is located beside an edge 591 of the wafer 590 (e.g., the edge 191 of the wafer 190) which is held on the wafer holder. In an embodiment, the wafer 590 has a vertical projection within the light reflection device 520, and the light reflection device 520 has a light reflection surface 530 that is tilted (i.e., non-coplanar) with respect to the wafer surface 592 of the wafer 590 and is around a circumference 593 of the wafer 590. In an embodiment, the light reflection surface 530 can be formed in the shape of a bowl (i.e., curved shape or shape of varied slope) by a milled bowl tool. In another embodiment, the wafer 590 is stationary with respect to the light reflection surface 530.

The apparatus 500 can also include a coherent light source 540 (e.g., the coherent light source 140) that is configured to generate (coherent) incident light (e.g., first to third incident light 541i-543i) to perform a scan (e.g., a raster scan and a sinusoidal scan) on the light reflection surface 530 of the light reflection device 520 and the wafer surface 592 of the wafer 590. In an embodiment, the light reflection surface 530 of the light reflection device 520 and the wafer surface 592 of the wafer 590 can be configured to reflect the incident light (i.e., the first to third incident light 541i-543i) and generate reflection light (e.g., first to third reflection light 541r-543r), respectively.

The apparatus 500 can also include a light detector 550 (e.g., the light detector 150) that is configured to detect the reflection light (i.e., the first and second reflection light 541r and 542r) reflected from the light reflection surface 530 of the light reflection device 520.

In an embodiment, the coherent light source 540, the light reflection device 520 and the light detector 550 can be arranged such that the incident light generated by the coherent light source 540 passes by the edge 591 of the wafer 590 and the corresponding reflection light generated by the light reflection surface 530 of the light reflection device 520 is detected by the light detector 550 and/or the reflection light generated by the light reflection surface 530 of the light reflection device 520 passes by the edge 591 of the wafer 590 and is detected by the light detector 550.

For example, the second incident light 542i generated by the coherent light source 540 passes by the edge 591 of the wafer 590 and the corresponding second reflection light 542r generated by the light reflection surface 530 of the light reflection device 520 is detected by the light detector 550, thus detecting the edge 591 of the wafer 590. As another example, the first reflection light 541r generated by the light reflection surface 530 of the light reflection device 520 passes by the edge 591 of the wafer 590 and is detected by the light detector 550, thus detecting the edge 591 of the wafer 590. By contrast, the third incident light 543i generated by the coherent light source 540 does not pass by the edge 591 of the wafer 590 and the corresponding third reflection light 543r generated by the wafer surface 592 of the wafer 590 neither passes by the edge 591 of the wafer 590 nor is detected by the light detector 550. It is thus determined that the edge 591 of the wafer 590 is not detected.

Figure 6:
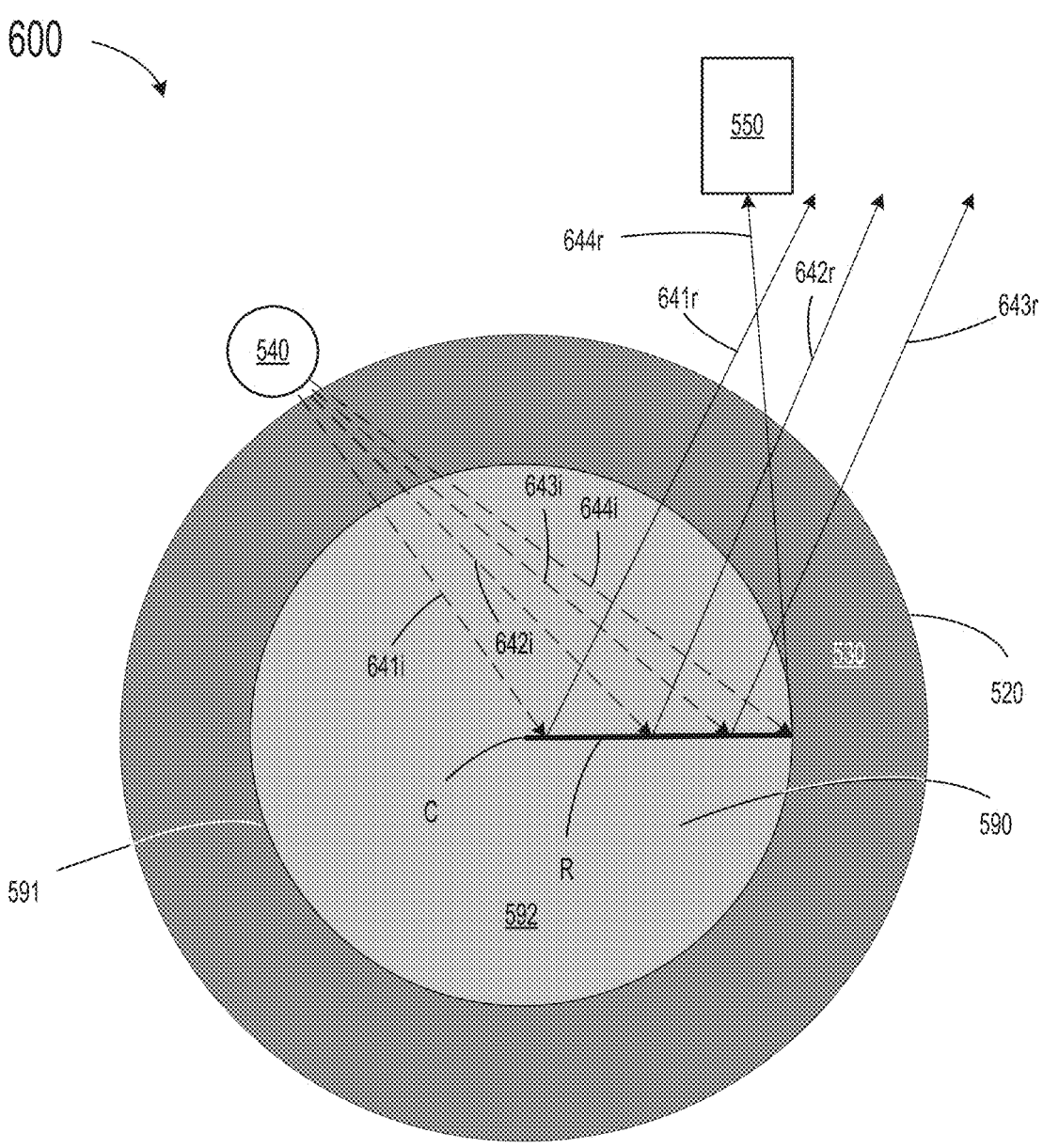
FIG. 6 is a top view of a sixth exemplary apparatus that includes non-planar reflection surfaces integrated with coherent light scan for Poseidon Tool Integration according to some embodiments of the present disclosure.

FIG. 6 is a top view of an exemplary apparatus 600 that includes non-planar reflection surfaces integrated with coherent light scan (e.g., laser scan) for Poseidon Tool Integration according to some embodiments of the present disclosure. The apparatus 600 can also include a wafer holder (e.g., the wafer holder 110) (not shown), the light reflection device 520, the coherent light source 540 and the light detector 550, as the apparatus 500 does. The apparatus 600 differs from the apparatus 500 shown in FIG. 5 in that in the apparatus 600 the wafer holder (and the wafer 590 as well) can be configured to rotate with respect to the light reflection device 520 and the coherent light source 540 can be configured to generate the (coherent) incident light (e.g., first to fourth incident light 641i-644i) to perform the scan on the wafer surface 592 of the wafer 590 and the light reflection surface 530 of the light reflection device 520 in a direction pointing along a radius R of the wafer 590 from a center C of the wafer 590, and the light detector 550 can be configured to detect the reflection light (i.e., first to fourth reflection light 641r-644r) reflected from the light reflection surface 530 of the light reflection device 520 and the wafer surface 592 of the wafer 590. As shown in FIG. 6, only the fourth incident light 644i is shined on the light reflection surface 530 of the light reflection device 520 and, thus, only the fourth reflection light 644r can be detected by the light detector 550.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a dielectric layer on or overlying a base substrate structure such as a thin film. Thus, substrate is not limited to any particular base structure, underlying dielectric layer or overlying dielectric layer, patterned or un-patterned, but rather, is contemplated to include any such dielectric layer or base structure, and any combination of dielectric layers and/or base structures. The description may reference particular types of substrates, but this is for illustrative purposes only.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An apparatus, comprising:
a wafer holder configured to hold a wafer thereon;
a first light reflection device located beside an edge of the wafer held on the wafer holder, the first light reflection device having a first light reflection surface tilted with respect to a wafer surface of the wafer;
a coherent light source configured to generate incident light to perform a scan on the wafer surface of the wafer and the first light reflection surface of the first light reflection device, the wafer surface of the wafer and the first light reflection surface of the first light reflection device reflecting the incident light to generate reflection light; and
a light detector configured to detect the reflection light, wherein the coherent light source, the first light reflection device and the light detector are arranged such that the incident light generated by the coherent light source directly passes by the edge of the wafer and the reflection light generated by the first light reflection surface of the first light reflection device is directly detected by the light detector.

2. The apparatus of claim 1, wherein the wafer holder and the first light reflection device are configured to rotate with respect to each other.

3. The apparatus of claim 2, wherein the wafer holder is configured to rotate with respect to the first light reflection device.

4. The apparatus of claim 2, wherein the first light reflection device is configured to rotate with respect to the wafer holder, and an angle at which the first light reflection surface of the first light reflection device is tilted with respect to the wafer is adjusted in accordance with a relative position of the rotating first light reflection device with respect to the coherent light source.

5. The apparatus of claim 2, wherein the coherent light source is configured to generate the incident light to perform the scan on the wafer surface of the wafer and the first light reflection surface of the first light reflection device in a direction pointing along a radius of the wafer from a center of the wafer.

6. The apparatus of claim 1, wherein the scan is a raster scan.

7. The apparatus of claim 1, wherein the scan is a sinusoidal scan.

8. The apparatus of claim 1, further comprising:
a second light reflection device located beside the edge of the wafer, the second light reflection device having a second light reflection surface tilted with respect to the wafer surface of the wafer,
wherein the coherent light source is further configured to generate the incident light to perform the scan on the second light reflection surface of the second light reflection device, the second light reflection surface of the second light reflection device reflects the incident light to generate reflection light, and the coherent light source, the first light reflection device and the light detector are arranged such that the incident light generated by the coherent light source passes by the edge of the wafer and the reflection light generated by the second light reflection surface of the second light reflection device is detected by the light detector or the reflection light generated by the second light reflection surface of the second light reflection device passes by the edge of the wafer and is detected by the light detector.

9. The apparatus of claim 8, wherein the first light reflection device and the second light reflection device are separated from each other by a gap.

10. The apparatus of claim 1, wherein the light detector is located over a center of the wafer.

11. The apparatus of claim 1, wherein the light detector is located over a non-center of the wafer.

12. The apparatus of claim 11, wherein the light detector is located over the edge of the wafer.

13. The apparatus of claim 1, wherein the wafer holder is stationary with respect to the first light reflection device, the coherent light source is stationary with respect to the light detector, and the first light reflection device and the coherent light source move with respect to each other along a direction parallel to the first light reflection surface of the first light reflection device.

14. The apparatus of claim 1, wherein the wafer has a vertical projection within the first light reflection device, and the first light reflection surface is around a circumference of the wafer.

15. The apparatus of claim 14, wherein the wafer holder is stationary with respect to the first light reflection device.

16. The apparatus of claim 1, wherein the wafer has a wafer notch formed at the edge.

17. The apparatus of claim 1, wherein the wafer has a wafer flatness formed at the edge.

18. The apparatus of claim 1, wherein the coherent light source is a laser source.

19. The apparatus of claim 1, wherein the wafer holder is a wafer chuck.

20. The apparatus of claim 19, wherein the wafer chuck is a vacuum spin chuck.

* * * * *